(12) United States Patent
Mazzarolo

(10) Patent No.: US 7,968,033 B2
(45) Date of Patent: Jun. 28, 2011

(54) PAPER FOOD CONTAINER WITH INJECTION MOLDED TOP RIM STRUCTURE AND METHOD OF MAKING SAME

(76) Inventor: Ivonis Mazzarolo, Vaudreuil (CA)

( * ) Notice: Subject to any disclaimer, the term of this patent is extended or adjusted under 35 U.S.C. 154(b) by 0 days.

(21) Appl. No.: 12/630,266

(22) Filed: Dec. 3, 2009

(65) Prior Publication Data
US 2010/0147447 A1 Jun. 17, 2010

Related U.S. Application Data

(63) Continuation of application No. 11/704,472, filed on Feb. 8, 2007, now abandoned, which is a continuation-in-part of application No. 11/372,712, filed on Mar. 10, 2006, now Pat. No. 7,520,404.

(51) Int. Cl.
    *B29C 65/78* (2006.01)
(52) U.S. Cl. ...................................... 264/274
(58) Field of Classification Search .................. 264/274, 264/268, 271.1
    See application file for complete search history.

(56) References Cited

U.S. PATENT DOCUMENTS

| 4,238,047 | A | 12/1980 | Helms et al. |
| 4,346,832 | A | 8/1982 | Werner |
| 5,156,273 | A | 10/1992 | Mortensen |
| 5,647,501 | A | 7/1997 | Helms |
| 5,911,334 | A | 6/1999 | Helms |
| 6,053,353 | A | 4/2000 | Helms |
| 6,196,451 | B1 | 3/2001 | Helms |
| 6,471,083 | B1 | 10/2002 | Helms |
| 6,516,548 | B2 | 2/2003 | Lage et al. |
| 6,523,713 | B1 | 2/2003 | Helms |
| 2003/0192891 | A1 | 10/2003 | Ziegler |
| 2004/0105917 | A1 | 6/2004 | Mannion et al. |
| 2004/0262322 | A1 | 12/2004 | Middleton et al. |

FOREIGN PATENT DOCUMENTS

| GB | 2171048 | * | 8/1986 |
| JP | 60-96234 | * | 7/1985 |

* cited by examiner

*Primary Examiner* — Jill L Heitbrink
(74) *Attorney, Agent, or Firm* — Young Basile Hanlon & MacFarlene PC

(57) ABSTRACT

A food container in the form of a paper cup having a top edge and a plastic rim structure which is injection molded to the edge so as to seal the edge and be firmly be adhered thereto. The rim structure exhibits a flat annular upper surface to which a heat sealable closure made of metal foil with heat sealable plastic underlayer can be attached after filling the container with a suitable food product.

3 Claims, 7 Drawing Sheets

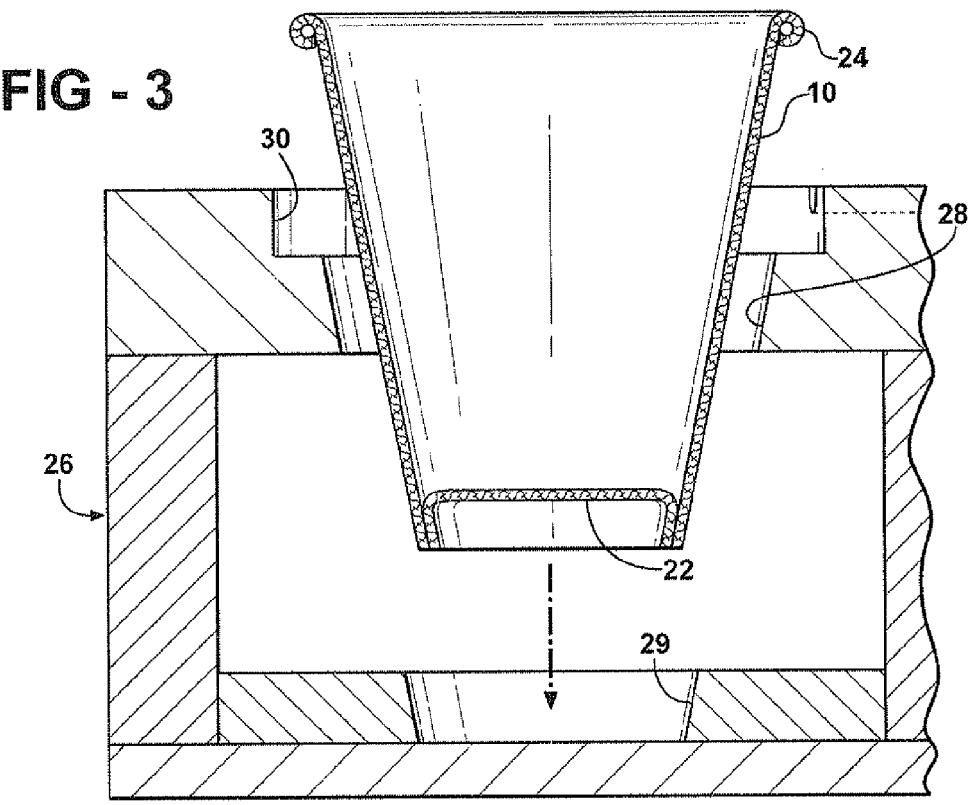
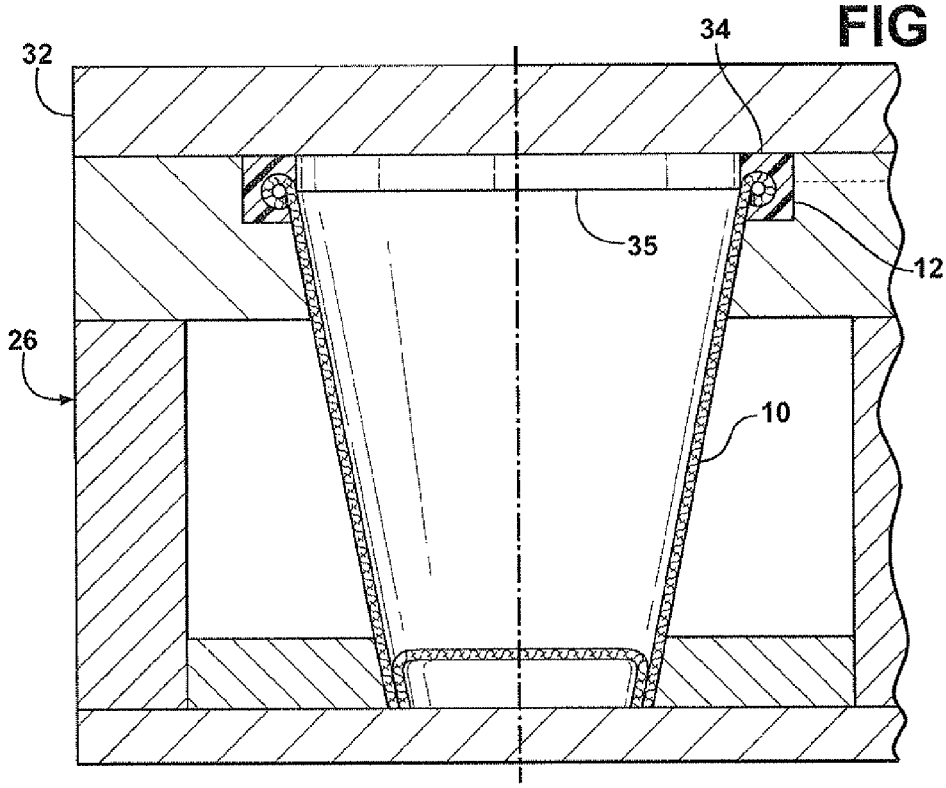

US 7,968,033 B2

PAPER FOOD CONTAINER WITH INJECTION MOLDED TOP RIM STRUCTURE AND METHOD OF MAKING SAME

RELATED APPLICATION

This application is a continuation of U.S. application Ser. No. 11/704,472 filed on Feb. 8, 2007, now abandoned, which is a continuation-in-part of 11/372,712, filed Mar. 10, 2006 now U.S. Pat. No. 7,520,404 issued Apr. 21, 2009. The content of the U.S. patent Ser. No. 11,704,472 and U.S. Pat. No. 7,520,404 are incorporated herein by reference.

FIELD OF THE INVENTION

This invention relates to food containers and more particularly to a cup-shaped paper container having an open top and a plastic rim structure which is injection molded in adhering and encapsulating relationship to the top of the container sidewall so as to be capable of receiving in sealed relationship therewith a heat sealable cover. The invention also relates to a method of manufacturing such an article and to a method of packaging food using such an article.

BACKGROUND OF THE INVENTION

It is known to provide food products such as yogurt in plastic containers having sealed foil covers. However, the price of plastic used to manufacture such containers is closely tied to the price of oil which, for a number of years has seen a steady upward trend. It is therefore desirable to use paper containers provided they can meet the requirements associated with the packaging of food products. One problem with the use of paper to hold semi-liquid and liquid products is the difficulty of attaching a heat sealable foil cover to the container. That process is best achieved with a flat annular rim around the top of the container capable of sustaining a wide range of pressures and temperatures during the product filling and sealing steps. Paper alone is not conducive to these steps. Another problem associated with the use of paper is maintaining a seal along the inside edge of the glued seam which runs from top to bottom of the cup.

SUMMARY OF THE INVENTION

According to the first aspect of the present invention, an article of manufacture is provided in the form of a cup-shaped paper container having an open top, and a plastic rim structure injection molded to the open top so as to encapsulate and seal same, to prevent the loss or migration of moisture into the cup material and to provide a substantially flat annular seat for a heat sealable cover of foil or other suitable material.

In one illustrative embodiment, the paper container includes a rolled rim at the top edge of the paper cup. The molded plastic rim encapsulates the rolled rim and is securely fastened to the cup.

In another illustrative embodiment, the container has a plain, unrolled top edge, and a rim structure is injection molded to it so as to seal the edge by encapsulation and provide a flat, annular seat area above it. In addition, the inside edge of the side seam is sealed to prevent moisture or fatty substances from migrating into the paper. Optionally, the attachment of the rim to the cap may be enhanced by providing a series of circumferentially-spaced holes in the cup sidewall just below the top edge. The plastic of the molded rim flows into and seals the holes in the molding process.

According to the second aspect of the invention, an article of manufacture as described above is made by placing a paper cup having a top edge in a mold, closing the mold, and injecting into the mold a sufficient molten plastic material to form around and in encapsulating adhering relationship to the top edge, an annular rim structure having a substantially flat upper annular seating surface. The cup with the adhered plastic rim is thereafter removed from the mold and sent to a food processor where the cup is filled with product and sealed using a laminated foil or other material covering structure as described above. Thus the invention includes not only the method of manufacturing the article, but the further and more comprehensive method of packaging food using such an article.

BRIEF DESCRIPTION OF THE DRAWINGS

FIG. 3 is a side view in section of a paper cup of FIG. 2 being inserted into a mold;

FIG. 4 is a side view in section of the paper cup of FIG. 3 after insertion into the mold and injection molding a rim structure;

DETAILED DESCRIPTION OF A PREFERRED EMBODIMENT

Figure 1:
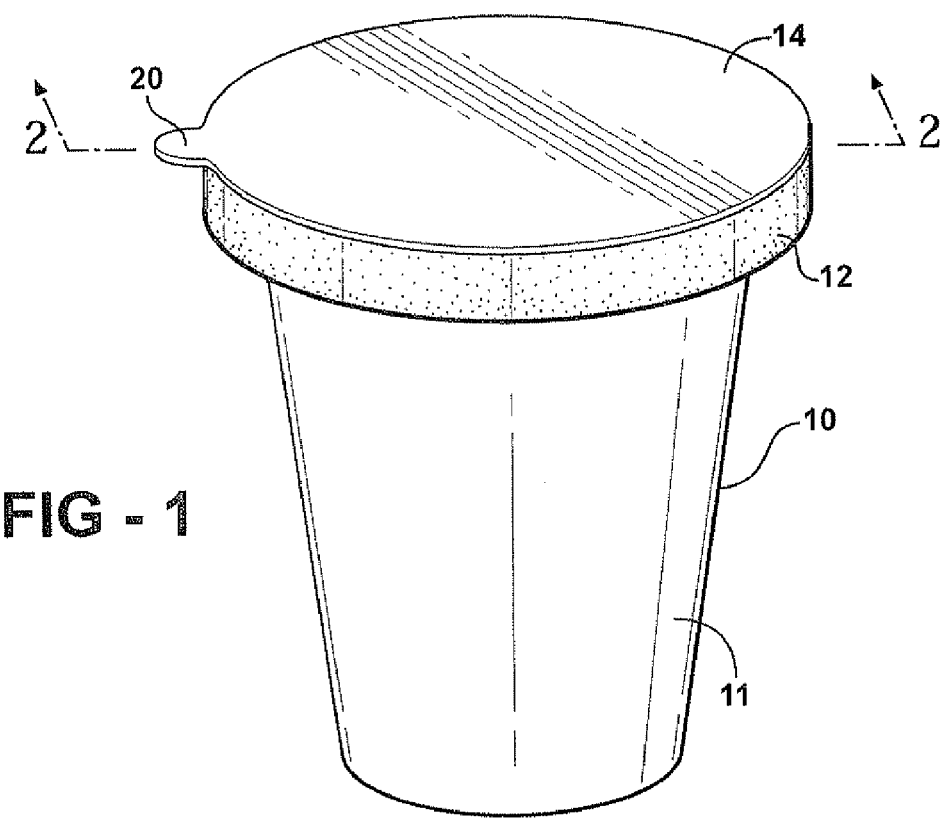
FIG. 1 is a perspective view of a food container manufactured in accordance with the present invention.
Figure 2:
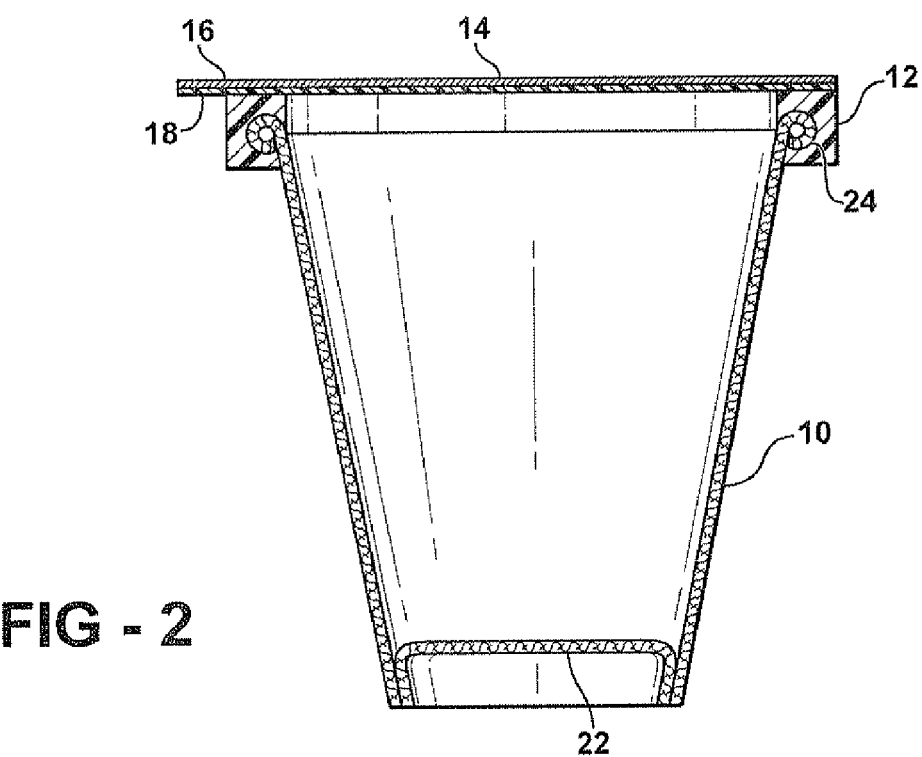
FIG. 2 is a side view in section of a first embodiment of the invention.

Referring to FIGS. 1 and 2 there is shown a tapered, cup-shaped paper container 10 having a glued side seam 11 and adheringly attached to the upper open end thereof an injection molded plastic rim structure 12 to which a heat sealable foil closure 14 has been attached. The closure 14 comprises an upper layer of metal foil and a lower layer of heat sealable plastic which is adhered to the flat top surface of the rim structure 12 by suitable heated press means (not shown). A lifting tab 20 is provided at the outer edge of the sealing cover 14 to assist in removing the cover 14 from the cup-shaped container 10 to provide access to the contents thereof. The cup-shaped container 10 is made substantially entirely of paper. The forming process for making paper cups is well known and involves rolling a flat blank into a frusto-conical or other shape and gluing or bonding the overlapping edges of the blank to form seam 11. A paper bottom 22 is added and secured in place by a suitable adhesive. At least the interior surfaces of the container 10 are seal-coated so as to become substantially moisture impermeable by application of a plastic coating material selected from the group consisting of polyolefins, polyurethane and polyethylene. This is typically accomplished by coating the paper while it is still flat. When such flat material is cut to form a blank, the vertical edge which ends up on the inside of the cup is unsealed. To prevent liquid and fatty material from migrating into the cup material, the inside edge is re-sealed after cutting the blank from the flat paper board and before the seam 11 is formed and glued. The term "cup shaped", as used herein, refers to cylindrical as well as tapered and reversely tapered containers.

According to a first embodiment, the upper edge of the container 10 is tightly rolled at 24. Except for the re-sealing of the inside edge as explained above, the manufacturing steps and equipment used to produce an article as thus far described are conventional and well known. In this embodiment, the rolled edge 24 enhances the attachment of the rim structure 12.

Figure 5:
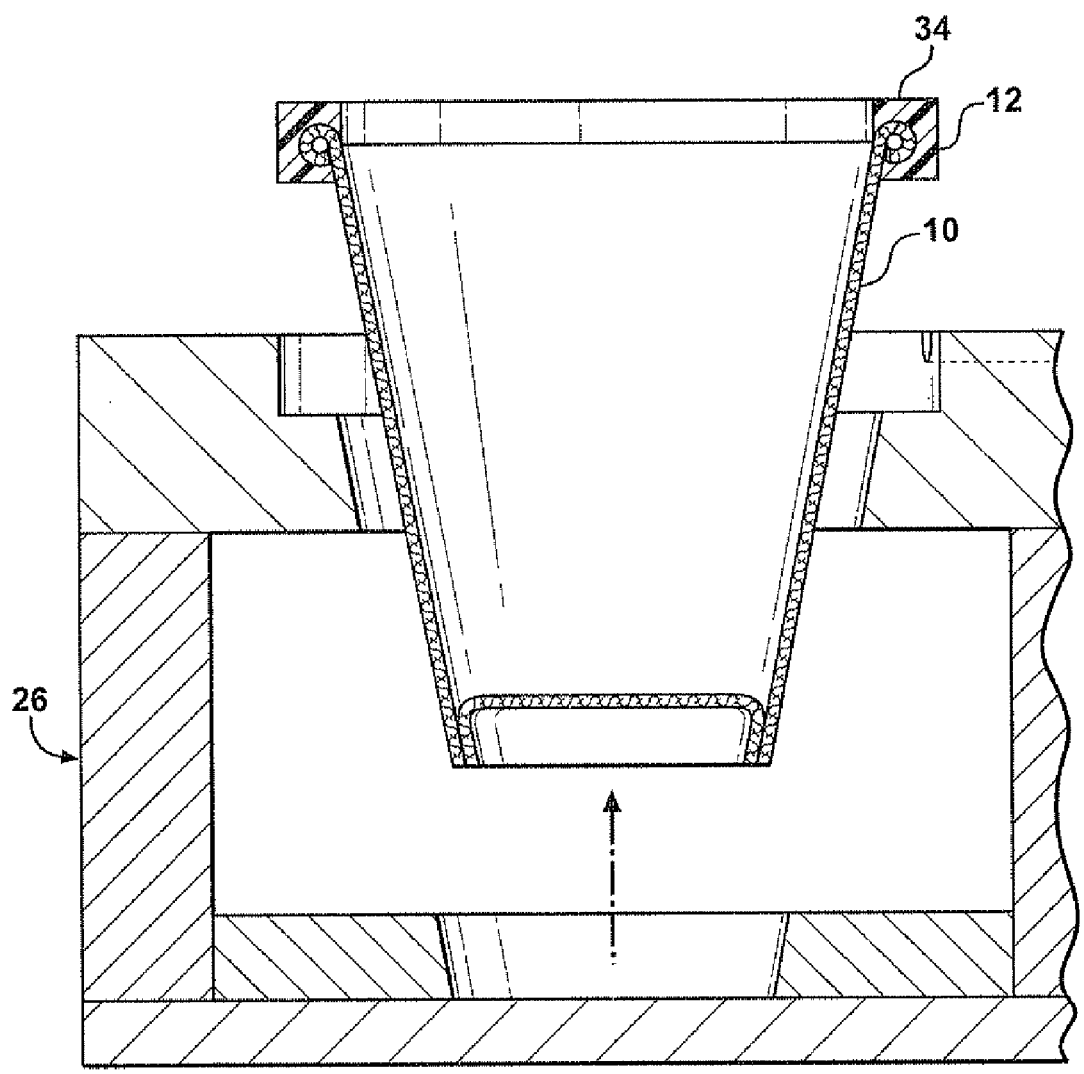
FIG. 5 is a side view in section of the open mold with the cup of FIG. 2 being removed from the mold.

Referring now to FIGS. 3, 4 and 5, the additional steps needed to convert the paper cup 10 into a food product container in accordance with the present invention will be described. As shown in FIG. 3, a suitable injection molding apparatus 26 capable of withstanding high pressure conditions is shown to comprise tapered support surfaces 28 and 29 sized and shaped to receive and support the cup-shaped paper container 10 therein. When fully inserted, the rolled rim 24 of the paper container lies within an annular upper cavity 30 in a spaced relationship with all surfaces thereof.

Turning now to FIG. 4, the mold 26 is closed by adding a high pressure cover 32. A plug 35 attached to the mold cover 32 defines the inside surface of an annular mold cavity. The plug 35 touches the inside surface of the cup 10 and prevents plastic from flowing down the inside of the cup. Molten plastic material such as molten polyethylene is injected into the space between the cavity 30 and the upper, outer and lower quadrants of the rolled edge 24. This results in the formation of the plastic rim structure 12 in adhering and surrounding relationship to the rolled edge 24. It will be noted in FIG. 4 that the cover 32 forms a flat annular upper surface 34 on the injection molded rim structure 12. The radial width of the upper surface 34 is uniform and between about ⅛ and ¼ of an inch.

As shown in FIG. 5, after the injection molding process has been completed, the mold 26 is opened and the finished article consisting of paper cup 10 and upper rim structure 12 is removed. Rim structure 12 is now well adhered to the cup 10 and will not shift, collapse or separate from the cup even when subjected to the forces associated with the application and removal of the cover 14. Moreover, it provides the advantage of a substantially flush relationship with the interior surface of the cup 10 such that it is easy to fully remove the contents of the cup with a spoon or other utensil.

Figure 6:
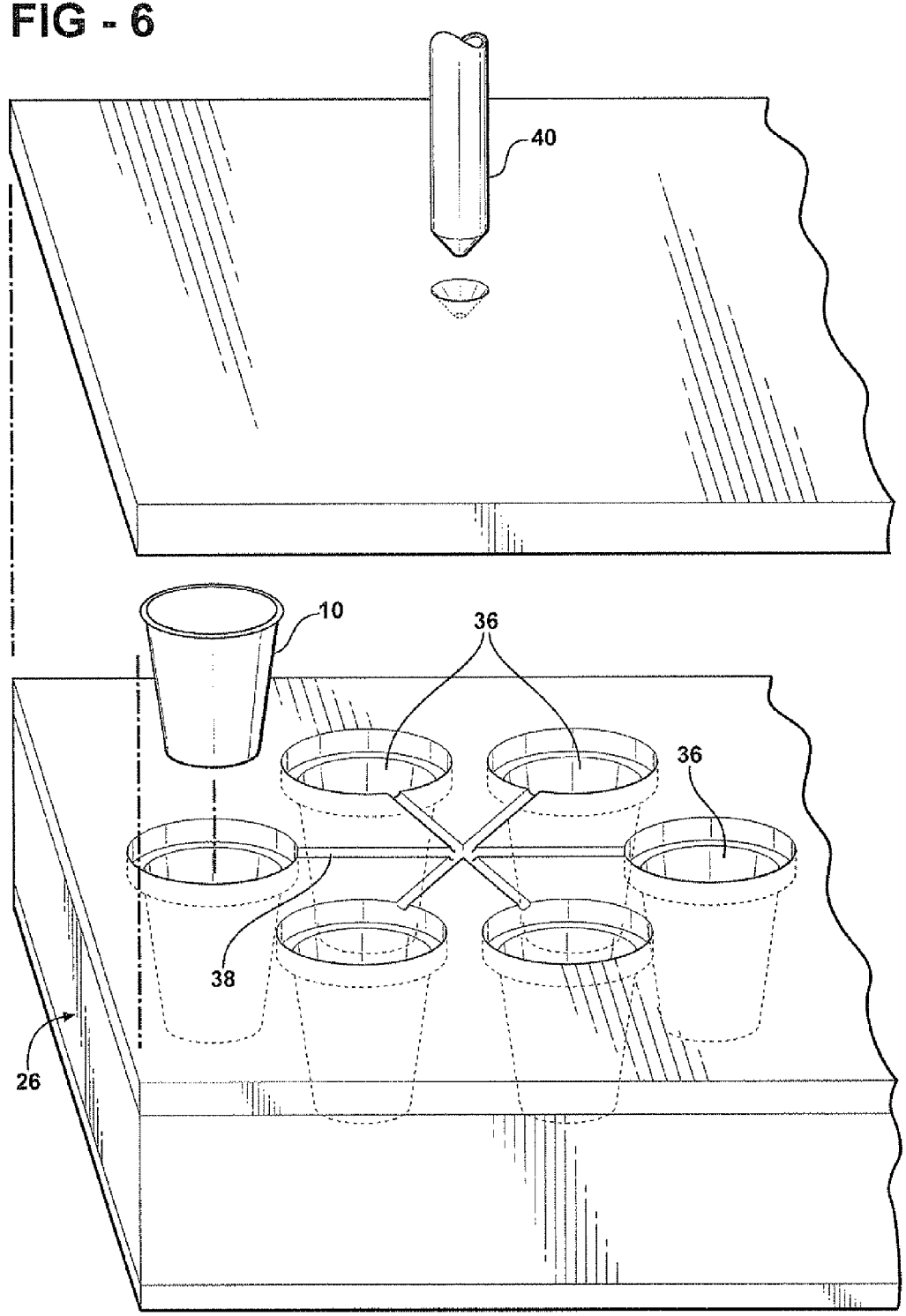
FIG. 6 is a perspective view of a representative mold showing how multiple articles incorporating the principals of the present invention are simultaneously formed.

FIG. 6 shows the mold 26 to comprise multiple mold cavities 36 interconnected by a runner system 38 which permits the simultaneous molding of six rim structures 12 in association with six identical paper cups 10. The injector 40 for the plastic material is shown.

Figure 7:
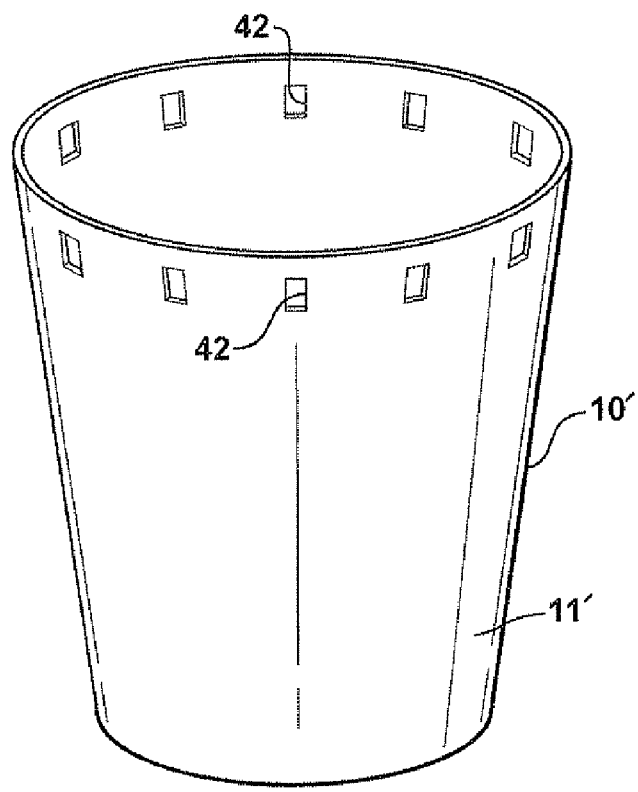
FIG. 7 is a perspective view of a second embodiment of a cup before injection molding the rim.
Figure 8:
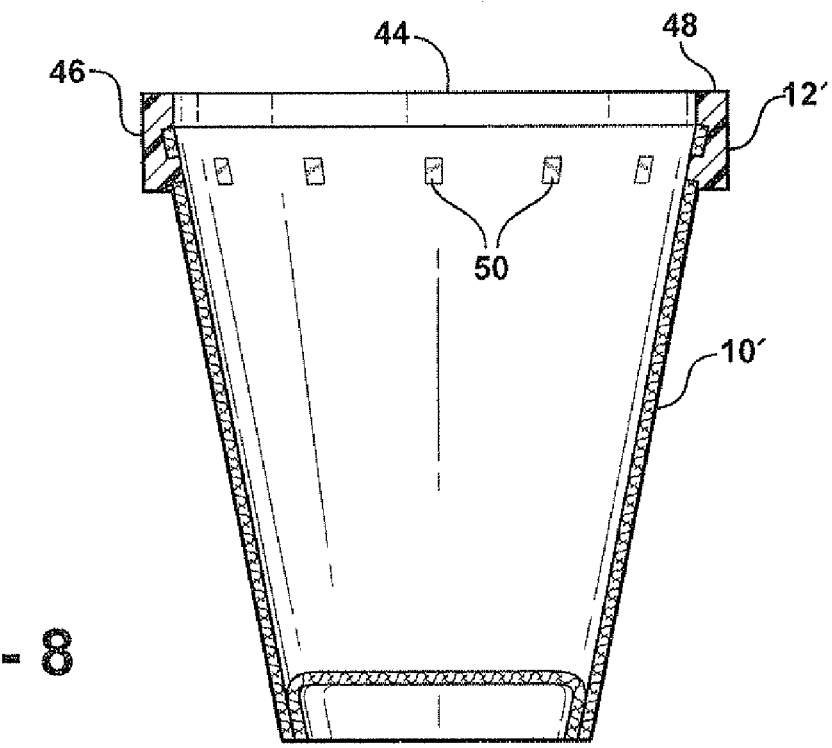
FIG. 8 is a side view, in section, of the cup of FIG. 7 after molding the rim structure.

Referring now to FIGS. 7 and 8, a second embodiment of the invention will be described. In this embodiment, a paper cup 10' is constructed according to the description above except for the fact that the top edge is not rolled. Instead, a plurality of circumferentially spaced holes 42 are formed in the paper sidewall about ⅛ of an inch below the upper edge 44. The holes are preferably formed in the paper blank before it is rolled into the cup shape. The inside edge of the seam 11 is also sealed as described above. The cup is inserted into a mold similar to that shown in FIGS. 3-5 and a rim structure 12' having a flat annular top 48 is injection molded to the top of the cup 10 such that injected plastic flows into the holes 42 to form plugs 50 which enhance the mechanical attachment of the rim 12' to the paper cup 10. In this embodiment, the edge 44 is not rolled. However, both the rolled rim 24 and the holes 42 may be used in combination if desired.

After the article shown in either FIG. 5 or FIG. 8 is manufactured, it is shipped to food processor who fills the container with a liquid, semi-liquid or dry food product. Thereafter, the container is sealed by applying the foil cover 14 to the flat annular rim surface 34 or 48 and applying a heated press or platen to the article to bond or weld the plastic under material 18 to the top surface 34 or 48 of the polyethylene rim structure 46. Polyethylene is given by way of example as other injectable plastics may also be used.

The purchaser of the food product in the container holds the container 10 in one hand and grasps the tab 20 in the other hand and peels it back to remove the cover 14 from the cup-shaped container 10. The forces involved in disassociating the bonded plastic under layer from the rim structure 12 are far less than those which would be required to mechanically disassociate the rim structure 12 from the rolled rim 24. Thus, the food container has the structural integrity of a full plastic article while being susceptible of manufacture at a reduced price.

Figure 9:
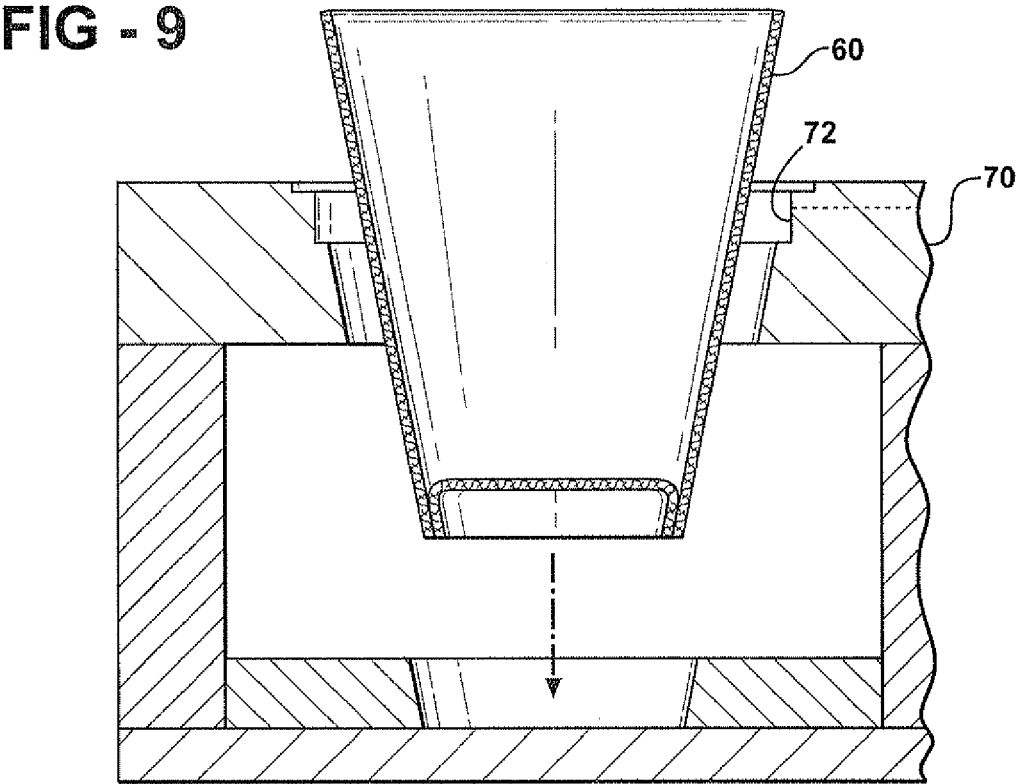
FIG. 9 shows a molding step associated with the manufacture of still another embodiment of the invention.
Figure 10:
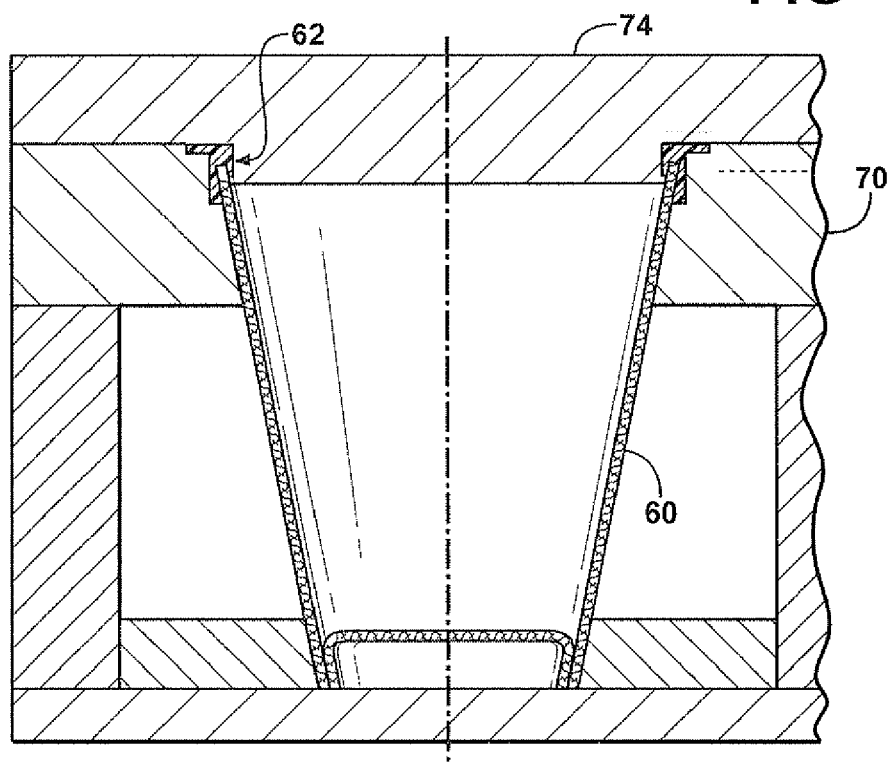
FIG. 10 shows a further molding step for the embodiment of FIG. 9.
Figure 11:
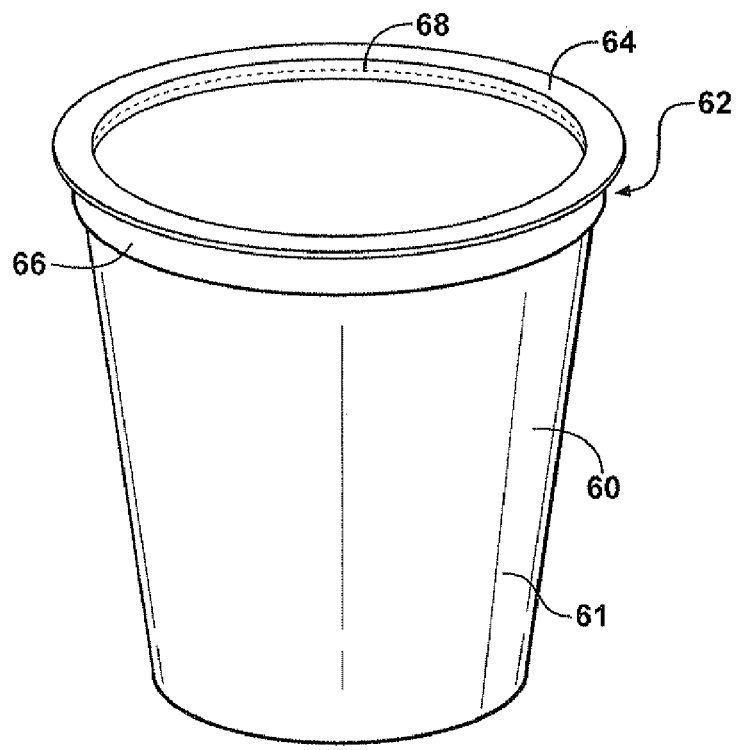
FIG. 11 is a perspective view of the embodiment made by the molds shown in FIGS. 9 and 10.
Figure 12:
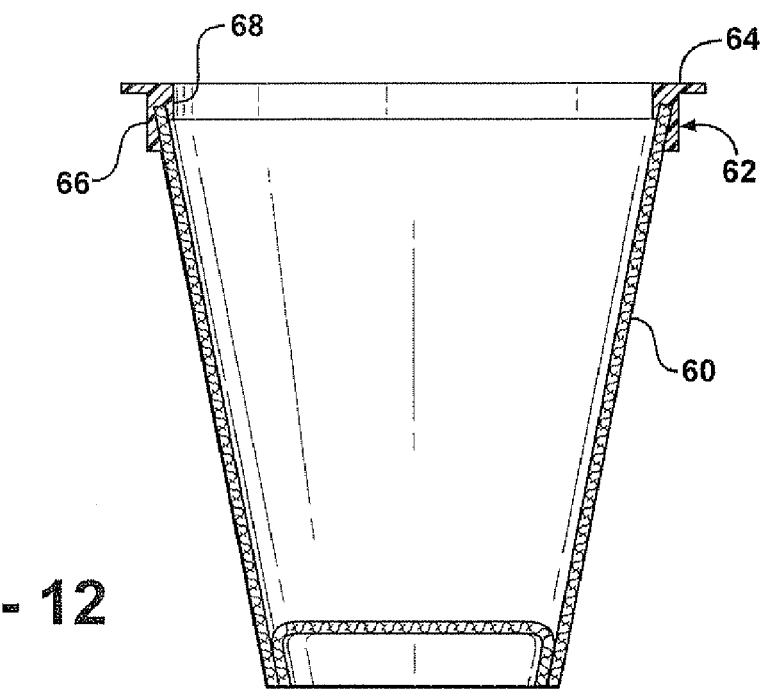
FIG. 12 is a sectional side view of the embodiment of FIG. 11.

Referring now to FIGS. 9-12, the preferred embodiment of the invention is shown to comprise a paper cup 60 having a straight, i.e., unrolled, upper edge to which a rim structure 62 has been injection molded in such a way as to encapsulate and seal the upper edge of the paper cup 60 and to provide a substantially flat and relatively wide annular seat surface 64 to receive a cover as previously described with reference to FIGS. 1 and 2. Cup 60 has an edge seam 61 similar to seams 11 and 11' of the previously described embodiments. As best shown in FIGS. 11 and 12, the rim structure 62 comprises an outer leg 66 which overlies and extends down along the outer surface of the cup 60 approximately ¼ to ⅜ of an inch, An inner surface 68 extends only slightly down the inside surface of the cup 60 so as to completely seal and encapsulate the upper edge of the cup 60 to prevent the ingestion of any moisture into the paper. The inside vertical edge in the seam 61 is sealed as described above. The rim structure 62 provides a flat and relatively wide annular seating surface 64, the outside diameter of which is greater than the outside diameter of the cup 60 as shown in FIGS. 11 and 12. The outside diameter of the rim 64 is also greater than the outside diameter of the outside wall portion 66, thereby providing a neater appearance and saving on plastic relative to the embodiment of FIG. 2. It has been found unnecessary to provide the holes as shown in FIGS. 7 and 8 to ensure a firm attachment of the rim structure 62 to the cup 60.

FIGS. 9 and 10 show the mold 70 which is used to manufacture the article of FIGS. 11 and 12. The mold is configured at 72 to provide the shape of the rim structure 62 and the cup 60 is inserted into the mold in the manner shown. Once inserted, a top tool 74 is brought into position atop the mold 70 and fluid plastic is injection molded into the annular space between the two tools, 70, 74 and around the top edge of the cup 60. This fully encapsulates and seals the top edge of the cup and provides the rim structure previously described. The cup 60 with the injection molded attached rim structure 62 may thereafter be sent to a filling and sealing operation as previously described.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method of manufacturing a cup-shaped food container comprising the steps of:

forming a fully assembled cup shaped paper container having a side seam, a bottom, a side wall integrally bonded to said bottom and having an inside surface and an outside surface, which surfaces co-terminate in an unrolled, unflanged, fully annular top edge;

placing the assembled paper container into a mold which provides a generally annular cavity continuously around the top portion of the inside and outside surfaces as well as the top edge;

injection molding a radially flanged, annular plastic rim structure into the cavity so as to adhere to and encapsulate the top edge and to extend in an integral and fully circumferential fashion a first distance down the outside surface and a second distance down the inside surface, the first and second distances being short relative to the overall height of the cup-shaped container, such that the outside surface remains substantially fully exposed between the rim and the bottom structure, while providing a flat annular upper surface which includes a radial flange extending radially outwardly beyond the diameter of the paper container and is capable of receiving a closure on top of said flange in adheringly sealed association therewith; and removing the cup-shaped paper container with the injection molded plastic rim structure adhered thereto from the mold.

2. The method of claim 1 including the further step of sealing the inside edge of the side seam.

3. A method of claim 1 wherein the extent to which the plastic extends down the outside surface is greater than the extent to which the plastic extends down along the inside surface.

* * * * *